Dec. 16, 1958 A. VILLA TORRE Re. 24,578

BED ASSEMBLY

Original Filed May 18, 1956 3 Sheets-Sheet 1

INVENTOR.
ALFONSO VILLA TORRE
BY

McMorrow, Berman & Davidson
ATTORNEYS

Dec. 16, 1958 A. VILLA TORRE Re. 24,578
BED ASSEMBLY
Original Filed May 18, 1956 3 Sheets-Sheet 2
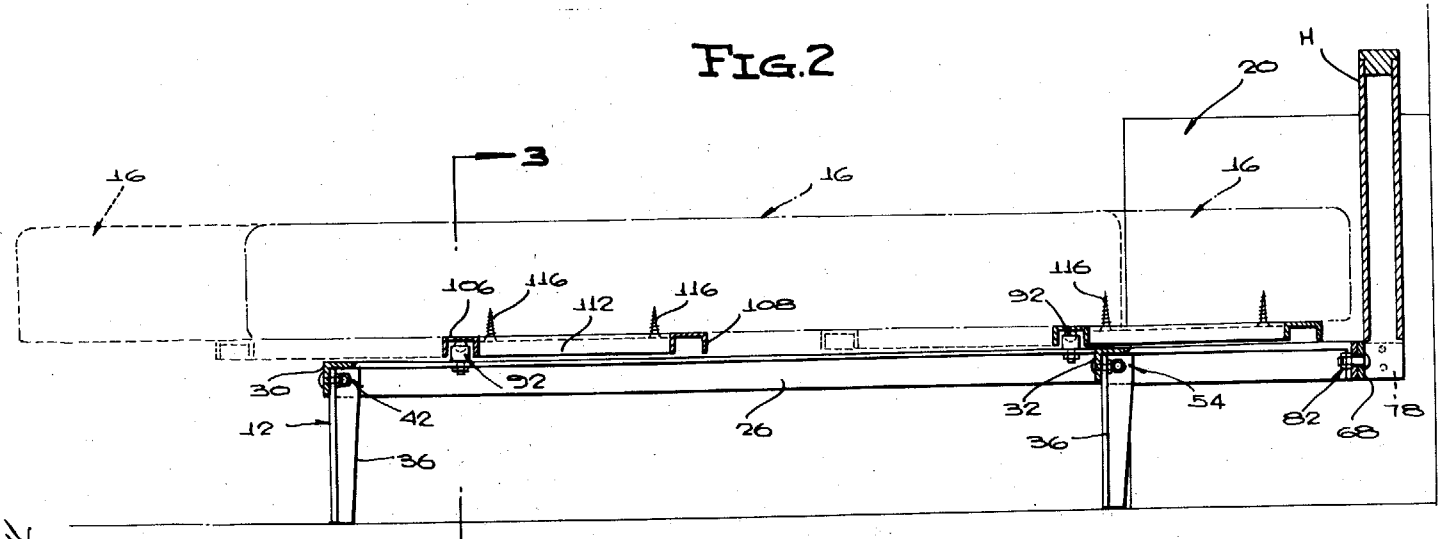
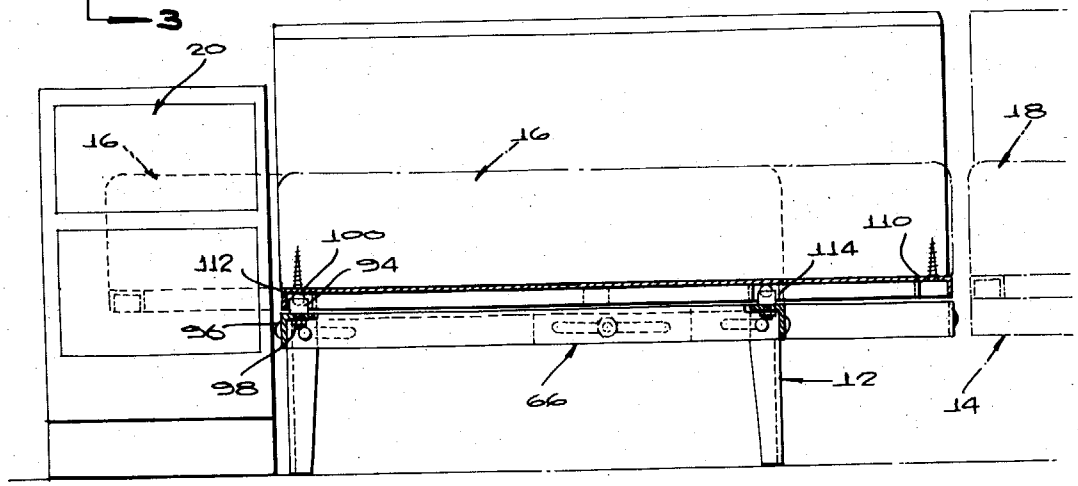
INVENTOR.
ALFONSO VILLA TORRE
BY
McMorrow, Berman & Davidson
ATTORNEYS Dec. 16, 1958 A. VILLA TORRE Re. 24,578

BED ASSEMBLY

Original Filed May 18, 1956 3 Sheets-Sheet 3

INVENTOR.
ALFONSO VILLA TORRE

BY

McMorrow, Berman + Davidson
ATTORNEYS

United States Patent Office

Re. 24,578

Reissued Dec. 16, 1958

24,578

BED ASSEMBLY

Alfonso Villa Torre, San Juan, Puerto Rico

Original No. 2,796,614, dated June 25, 1957, Serial No. 585,763, May 18, 1956. Application for reissue April 7, 1958, Serial No. 730,035

10 Claims. (Cl. 5—8)

Matter enclosed in heavy brackets [ ] appears in the original patent but forms no part of this reissue specification; matter printed in italics indicates the additions made by reissue.

This invention relates generally to bed constructions and is more particularly concerned with a novel bed support assembly for twin beds disposed adjacent each other to provide a simulated single oversized bed, a single bed disposed adjacent a wall of a room, or for a bed disposed in the corner of a room.

Wherein twin beds are disposed adjacent each other, or a single bed is disposed adjacent a wall or in a corner of a room, in order to make the bed each day or for the purpose of changing the bedding each day, in hotels for example, it has heretofore been necessary to move the bed frames on a support surface, this giving rise to excessive wear on the carpeting, as well as necessitating an appreciable amount of physical labor.

A primary object of invention is to provide a bed assembly incorporating a lower support frame reciprocably supporting thereon a rectangular box spring member, the support frame including vertically extending guide means and the box spring member including cooperating guide track means wherein the box spring member may be moved sequentially relative to the longitudinal and transverse axes of the support frame for providing an access passage between a pair of adjacent twin beds, between the support frame and an adjacent wall, or between the support frame and the corner of a room in which the bed assembly is disposed.

A further object of invention in conformance with that set forth is to provide a bed assembly including a pair of spaced parallel support frames reciprocably supporting thereon rectangular box spring members, the support frame and box spring members respectively including guide means and guide track means thereon permitting the box spring members to be moved independently and sequentially along a longitudinal and transverse axes of the support frames wherein an access space or passage is provided between the support frames upon which the box spring members are disposed.

Another object of invention in conformance with that set forth is to provide a novel bed assembly of the character set forth which includes transversely of one end thereof an adjustable headboard support assembly, said headboard support assembly including means permitting the same to be adjusted in length to accommodate various width headboards, and further, including additional means permitting said headboard support assembly to be adjusted transversely relative to one end of the support frame.

Other objects of invention reside in the specific details of the guide means on the support frame of the bed assembly involved, details of the guide track means on the box spring members of the bed assembly involved as well as in specific details of the headboard support assembly utilized in the invention.

A still further object of invention in conformance with that set forth is to provide a novel bed assembly of the character involved which is readily and economically manufactured, easily assembly and dismantled, and highly practical, serviceable and acceptable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 2 is a sectional view taken substantially on line 2—2 of Figure 1;

Figure 3 is a sectional view taken substantially on line 3—3 of Figure 2, one of the support frames and box spring members being shown fragmentarily in phantom lines.

Figure 1:
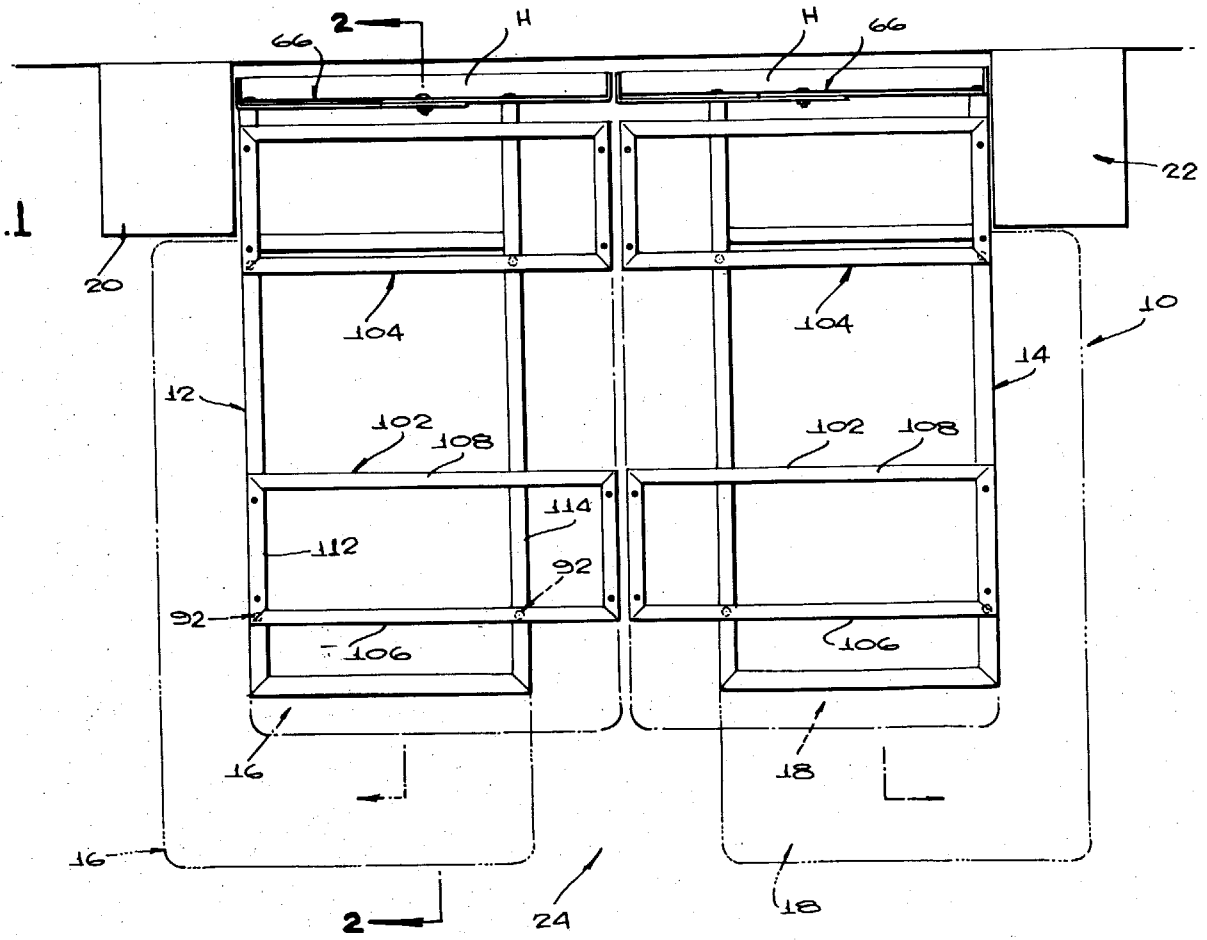
Figure 1 is a top plan view of a typical installation of the novel bed assembly, showing in phantom lines the box spring members thereof and the position to which they may be moved to provide an access passage therebetween.

Referring to the drawing in detail, a typical installation of the novel bed assembly is indicated generally at 10, this installation being that wherein a pair of twin beds are disposed adjacent each other providing a simulated oversized single bed. Although the novel bed assembly is disclosed relative to a twin bed installation, it is readily apparent that the novel bed assembly may incorporate the novel features of the invention utilizing but a single lower support frame member reciprocably supporting thereon a box spring member wherein the support frame member is disposed in spaced relationship from a wall of a room, and wherein the box spring member may be moved sequentially relative to the longitudinal and transverse axes of the lower support frame member, thus permitting an access passage between the support frame and the side wall adjacent thereto, it becoming readily apparent, as the invention is described in detail, that the novel bed assembly may also be utilized in the corner of a room, for example, permitting ready access about the box spring member of the bed assembly for the purpose of making up the bed and applying new bedding thereon, for example.

The novel bed assembly of the exemplary embodiment includes lower support frames 12 and 14, see Figure 1, reciprocably supporting thereon box spring members 16 and 18, respectively, the box spring members being of a conventional construction and being shown by means of phantom lines for the purposes of clarity. Each of the support frames 12 and 14 is of identical construction and accordingly, only one of which will be described in detail. When the novel invention is utilized in a twin bed installation, the support frames 12 and 14 will be disposed in substantially parallel spaced relationship, as clearly seen in Figure 1, this installation permitting the disposition of night tables 20 and 22 to respectively be disposed on opposite sides of the support frames 12 and 14. The night tables 20 and 22 will be conventionally located at the head of the bed assembly, and as will subsequently become apparent, the novel bed assembly will permit the box spring members 16 and 18 to be positioned as seen by the phantom lines of Figure 1, wherein an access passage indicated generally at 24 will be provided between the support frames 12 and 14.

Figure 4:
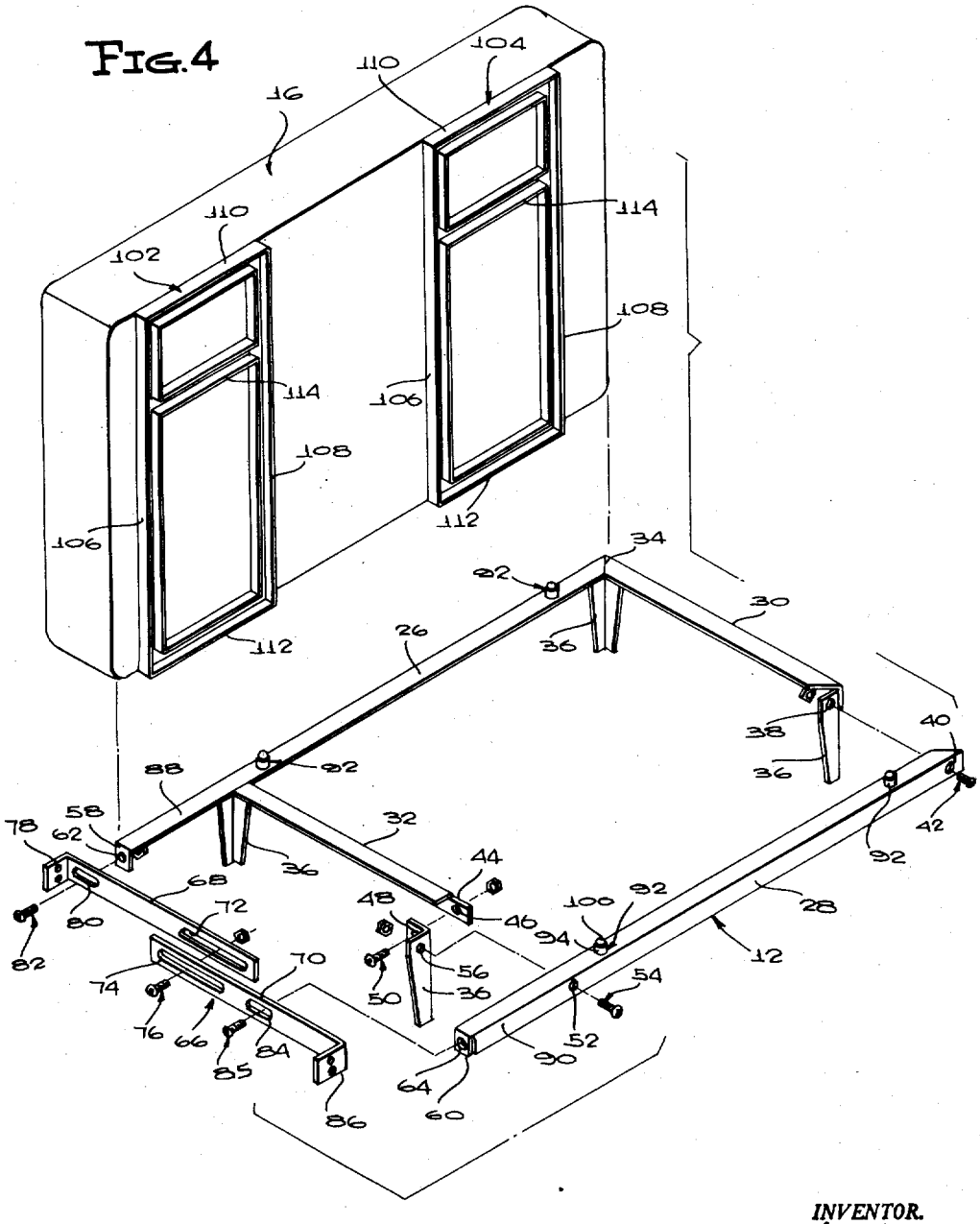
Figure 4 is an exploded perspective view of one of the lower support frames and the box spring members of the bed assembly.

Considering Figure 4, the support frame 12, as well as the support frame 14, includes rectangularly related side frame elements 26 and 28, and end frame elements 30 and 32. The frame elements 26 through 32 are constructed from standard structural members, i. e., angles having an L-shaped cross section. The end element 30 will normally be located at the foot of the bed. The adjacent ends of the side elements 26 and 28 and the end element 30 are mitered, as seen at 34, thus providing the right angled corners of the frames. Disposed at the corners of the frame elements are depending leg members 36. The leg members 36 also have an L-shaped cross section, and the upper ends thereof are disposed in the adjoining corners formed by the ends of the side frame elements 26 and 28 and the end frame element 30, this construction being that at the foot of the bed frame. As clearly seen in Figure 4, the leg members 36 include aperture portions 38 therethrough which are alignable with aperture portions 40 through the depending flanges of the side frame elements 26 and 28 and end frame element 30 and receive therethrough a suitable retaining nut and bolt assembly indicated generally at 42.

The other end frame element 32 includes notched end portions 44, see Figure 4, which are disposed beneath the under surface of the top flange of the side frame elements 26 and 28, the depending flange of the end frame element 32 having a transverse aperture portion 46 therethrough which is alignable with an aperture portion 48 extending through the rear leg members 36 and the alignable aperture portions 46 and 48 receive a screw and nut assembly 50 therethrough. The side frame elements 26 and 28 have extending transversely through an intermediate portion of the depending flange an aperture portion 52 receiving a suitable nut and bolt assembly 54 therethrough which extends through an aperture portion 56 of the leg members 36. Thus, it is readily apparent that the frames may be readily dismantled and shipped in a relatively compact package. The top flange portions of the side frame elements 26 and 28 include down-turned end portions 58 and 60 respectively, which have extending transversely therethrough aperture portions 62 and 64, respectively.

A headboard support assembly is indicated generally at 66, said headboard support assembly including a pair of elongated strap elements 68 and 70 which have respectively extending therethrough longitudinally extending elongated slot portions 72 and 74 which are normally disposed in overlying relationship and have a suitable nut and bolt assembly 76 extending therethrough. The elongated slot portions 72 and 74 permit longitudinal adjustment of the strap elements 68 and 70 with respect to each other for accommodating different widths of headboards. Extending through the strap element 68 adjacent the angulated end portion 78 thereof is a longitudinally extending elongated slot portion 80 which will receive therethrough a nut and bolt assembly indicated generally at 82, said nut and bolt assembly cooperating with the aperture portion 62 of the side frame element 26. The strap element 70 has extending longitudinally through an intermediate portion thereof an elongated slot portion 84 which receives a nut and bolt assembly 85 therethrough, said nut and bolt assembly extending through the aperture portion 64 in the end of the side frame element 28. The slot portions 80 and 84 permit the headboard support assembly to be adjusted transversely relative to the support frame 12 or 14. The strap element 70 also includes an angulated end portion 86 disposed opposite the angulated portion 78 of the strap element 68, these portions being transversely apertured and disposable on opposite sides of a headboard H, see Figure 1, the previously mentioned slot portions 72 and 74, and 80 and 84 permitting the headboards to be disposed adjacent each other to substantially simulate a single headboard. Inasmuch as the end frame element 32 extends between oppositely disposed intermediate portions of the side frame elements 26 and 28, the portions of said side frame elements to which the headboard support assembly 66 is secured, may be defined as support arms 88 and 90 on the respective side frame elements.

Extending vertically from an upper surface portion of the side frame elements 26 and 28 in longitudinally spaced relationship are guide means indicated generally at 92, said guide means comprising an upwardly opening tubular sleeve 94 having a depending threaded stud portion 96 extendable through a suitable aperture in the side frame elements and receiving a retaining nut element 98 thereon, see Figure 3. The sleeves 94 have suitably secured in exposed relationship on the upper ends thereof ball bearings 100 facilitating the movement of the bed spring members as subsequently will become apparent.

The box spring members 16 and 18, see Figure 4, have extending transversely therebeneath guide track means constituted by rectangularly shaped frame members indicated generally at 102 and 104. It will be noted that the box spring members are of a greater width than the lower support frames. The rectangularly shaped frame members 102 and 104 extend transversely beneath the lower surface of the box spring members and include side portions 106 and 108 suitably secured to end frame portions 110 and 112, said end frame portions 110 and 112 being in alignment with the opposite side edges of the box spring member. Extending transversely between intermediate portions of the side portions 106 and 108 is an intermediate track portion 114, it being noted, as seen in Figure 4, that the side, end and intermediate portions of the frame members 102 and 104 have an inverted U-shaped cross section, and defines a continuous downwardly opening track portion. The frame members 102 and 104 may be secured beneath the box spring members in any suitable manner, for example, by means of suitable wood screw elements 116, see Figure 2, extending through suitable aperture portions in said frame members and driven into suitable portions of the frame of the box spring member. The frame members 102 and 104 are disposed in overlying relationship relative to the guide means 92, and when the twin beds are disposed adjacent each other to define a simulated single oversized bed, the guide means on the lower support frames are located within the side portions 106 of the frame members 102 and 104, see Figure 1. When it is desired to obtain the access portion 24 between the lower support frames of the bed assembly, the box spring members may be moved independently relative to the longitudinal axes of the lower support frames, the guide means engaging portions 112 and 114 of the frames 102 and 104. After the box spring members have been moved toward the foot of the bed longitudinally relative to the lower support frames, the box spring member is then moved laterally away from each other, wherein the guide means 92 are disposed in the side portions 108 of the frames 102 and 104. Thus, as indicated by the right angled arrows in Figure 1, the box spring members may be moved sequentially and independently relative to the longitudinal and transverse axes of the lower support frames. *The sequential movement is made possible by means of the track portions of the guide track means which engage the guide means 92, some of the track portions being disposed parallel to and others transversely to the longitudinal axis of the box spring member to which secured.*

As previously mentioned, although the novel bed assembly has been described in detail in the exemplary embodiment relative to twin beds, it is readily apparent that a single support frame may be disposed in spaced parallel relationship relative to a wall of a room wherein, when the box spring member is moved into the position indicated by the arrows of Figure 1, an access passage will be provided between the lower support frame and such side wall. This novel bed assembly may also be utilized in the corner of a room, as is believed readily apparent.

Various positional and directional terms, such as "lower," "upper," etc., as utilized herein have only relative connotation to aid in describing the device and it is not intended to require any particular orientation with respect to external elements.

The foregoing is considered illustrative only of the principles of the invention. Further, since numerous modifications and changes will readily occur to those skilled in the art, it is not desired to limit the invention to the exact construction and operation shown and described, and accordingly, both modifications and equivalents may be resorted to, falling within the scope of the appended claims.

What is claimed as new is as follows:

1. A bed assembly comprising a lower support frame including rectangularly related side and end frame elements [including depending leg members adjacent intersecting corners of the frame elements], guide means extending vertically from spaced upper surface portions of the side frame elements adjacent the intersecting corners of the frame elements for reciprocably supporting a rectangular box spring member thereon, a rectangular box spring member of a greater width than the lower support frame juxtapositionable on the lower support frame, and guide track means on a lower surface portion of the box spring member engageable with the guide means on the side frame elements permitting the box spring member to be moved predetermined distances sequentially along the longitudinal and transverse axes of the lower support frame affording an access path between two lower support frames disposed in spaced parallel longitudinal alignment on the support surface, the guide track means comprising a pair of rectangular frames secured in spaced transverse relationship on intermediate under surface portions of the box spring member, said last mentioned frames including guide channel elements transversely of the box spring member and end channel elements in alignment with side edge portions of the box spring member, and an intermediate channel element extending between intermediate portions of the side channel elements of the rectangular frames, the distance between the side channel elements defining the amount of travel of the box spring member along the longitudinal axis of the lower support frame, and the distance between the intermediate channel elements and one end channel element defining the amount of travel of the box spring member relative to the transverse axis of the lower support frame.

2. A bed assembly comprising a lower support frame including rectangularly related side and end frame elements [including depending leg members adjacent intersecting corners of the frame elements], guide means extending vertically from spaced upper surface portions of the side frame elements adjacent the intersecting corners of the frame elements for reciprocably supporting a rectangular box spring member thereon, a rectangular box spring member of a greater width than the lower support frame juxtapositionable on the lower support frame, and guide track means on a lower surface portion of the box spring member engageable with the guide means on the side frame elements permitting the box spring member to be moved predetermined distances sequentially along the longitudinal and transverse axes of the lower support frame affording an access path between two lower support frames disposed in spaced parallel longitudinal alignment on the support surface, the guide track means comprising a pair of rectangular frames secured in spaced transverse relationship on intermediate under surface portions of the box spring member, said last mentioned frames including guide channel elements transversely of the box spring member and end channel elements in alignment with side edge portions of the box spring member, and an intermediate channel element extending between intermediate portions of the side channel elements of the rectangular frames, the distance between the side channel elements defining the amount of travel of the box spring member along the longitudinal axis of the lower support frame, and the distance between the intermediate channel elements and one end channel element defining the amount of travel of the box spring member relative to the transverse axis of the lower support frame, said channel elements including a communicating downwardly opening inverted U-shaped cross section track overlying the guide means on the lower support frame.

3. A bed assembly comprising a lower support frame including rectangularly related side and end frame elements [including depending leg members adjacent intersecting corners of the frame elements], guide means extending vertically from spaced upper surface portions of the side frame elements adjacent the intersecting corners of the frame elements for reciprocably supporting a rectangular box spring member thereon, a rectangular box spring member of a greater width than the lower support frame juxtapositionable on the lower support frame, and guide track means on a lower surface portion of the box spring member engageable with the guide means on the side frame elements permitting the box spring member to be moved predetermined distances sequentially along the longitudinal and transverse axes of the lower support frame affording an access path between two lower support frames disposed in spaced parallel longitudinal alignment on the support surface, the guide track means comprising a pair of rectangular frames secured in spaced transverse relationship on intermediate under surface portions of the box spring member, said last mentioned frames including guide channel elements transversely of the box spring member and end channel elements in alignment with side edge portions of the box spring member, and an intermediate channel element extending between intermediate portions of the side channel elements of the rectangular frames, the distance between the side channel elements defining the amount of travel of the box spring member along the longitudinal axis of the lower support frame, and the distance between the intermediate channel elements and one end channel element defining the amount of travel of the box spring member relative to the transverse axis of the lower support frame, said channel elements including a communicating downwardly opening inverted U-shaped cross section track overlying the guide means on the lower support frame, said guide means comprising bearing retainers supporting at their upper ends a ball bearing element received within the inverted U-shaped cross section track.

[4. A bed assembly comprising a lower support frame including rectangularly related side and end frame elements including depending leg members adjacent intersecting corners of the frame elements, guide means extending vertically from spaced upper surface portions of the side frame elements adjacent the intersecting corners of the frame elements for reciprocably supporting a rectangular box spring member thereon, a rectangular box spring member of a greater width than the lower support frame juxtapositionable on the lower support frame, guide track means on a lower surface portion of the box spring member engageable with the guide means on the side frame elements permitting the box spring member to be moved predetermined distances sequentially along the longitudinal and transverse axes of the lower support frame affording an access path between two lower support frames disposed in spaced parallel longitudinal alignment on the support surface, one of the end frame elements of the lower support frame extending between opposite intermediate portions of the side frame elements thereof defining a pair of support arms at one end of the lower support frame, and an adjustable headboard support assembly extending transversely between end portions of the support arms on the lower support frame, said adjustable headboard support assembly comprising a pair of elongated strap elements comprising overlapping end portions and including elongated longitudinally overlying slot portions therethrough, a fastener assembly extending transversely through the slot portions permitting the composite length of the strap elements to be adjusted, said strap elements including second elongated longitudinal slot portions therethrough, and fastening means extendable through the second slot portions in engagement with terminal end portions of the support arms permitting transverse adjustment of the headboard support assembly relative to the lower support frame, said strap elements including means thereon for receiving fastening elements therethrough securable to a headboard disposed vertically from one end of the lower support frame.]

5. A bed assembly comprising a pair of lower support frames disposed in spaced parallel relationship on a support surface and including rectangularly related side and end frame elements [having depending leg members adjacent intersecting corners thereof], guide means extending vertically from spaced upper surface portions of the side frame elements adjacent said intersecting corners, rectangular box spring members of a greater width than the lower support frames juxtapositionable on the support frames with side edge portions adjacent each other for supporting mattresses thereon defining a simulated single oversized bed, and guide track means on a lower support surface of the box spring members engageable with the guide means on the respective lower support frames permitting the box spring members to be moved independently and sequentially a predetermined distance along the longitudinal and transverse axes of the respective lower support frames affording an access passage between the lower support frames, the guide track means comprising a pair of rectangular frames secured in spaced transverse relationship at intermediate undersurface portions of each of the box spring members, the rectangular frames including side channel elements extending transversely of the box spring members and end channel elements in alignment with side edge portions of the box spring members, and an intermediate channel element extending between intermediate portions of the side channel elements, the distance between the side channel elements defining the amount of travel of the box spring members along the longitudinal axis of the lower support frames, and the distance between the intermediate channel element and one end channel element and adjacent side edges of the box spring members defining the amount of travel of the box spring members relative to the transverse axis of the lower support frames.

6. A bed assembly comprising a pair of lower support frames disposed in spaced parallel relationship on a support surface and including rectangularly related side and end frame elements [having depending leg members adjacent intersecting corners thereof], guide means extending vertically from spaced upper surface portions of the side frame elements adjacent said intersecting corners, rectangular box spring members of a greater width than the lower support frames juxtapositionable on the support frames with side edge portions adjacent each other for supporting mattresses thereon defining a simulated single oversized bed, and guide track means on a lower support surface of the box spring members engageable with the guide means of the respective lower support frames permitting the box spring members to be moved independently and sequentially a predetermined distance along the longitudinal and transverse axes of the respective lower support frames affording an access passage between the lower support frames, the guide track means comprising a pair of rectangular frames secured in spaced transverse relationship at intermediate undersurface portions of each of the box spring members, the rectangular frames including side channel elements extending transversely of the box spring members and end channel elements in alignment with side edge portions of the box spring members, and an intermediate channel element extending between intermediate portions of the side channel elements, the distance between the side channel elements defining the amount of travel of the box spring members along the longitudinal axis of the lower support frames, and the distance between the intermediate channel element and one end channel element and adjacent side edges of the box spring members defining the amount of travel of the box spring members relative to the transverse axis of the lower support frames, said channel elements including a communicating downwardly opening inverted U-shaped cross section track overlying the guide means on the lower support frames.

7. A bed assembly comprising a pair of lower support frames disposed in spaced parallel relationship on a support surface and including rectangularly related side and end frame elements [having depending leg members adjacent intersecting corners thereof], guide means extending vertically from spaced upper surface portions of the side frame elements adjacent said intersecting corners, rectangular box spring members of a greater width than the lower support frames juxtapositionable on the support frames with side edge portions adjacent each other for supporting mattresses thereon defining a simulated single oversized bed, and guide track means on a lower support surface of the box spring members engageable with the guide means of the respective lower support frames permitting the box spring members to be moved independently and sequentially a predetermined distance along the longitudinal and transverse axes of the respective lower support frames affording an access passage between the lower support frames, the guide track means comprising a pair of rectangular frames secured in spaced transverse relationship at intermediate undersurface portions of each of the box spring members, the rectangular frames including side channel elements extending transversely of the box spring members and end channel elements in alignment with side edge portions of the box spring members, and an intermediate channel element extending between the intermediate portions of the side channel elements, the distance between the side channel elements defining the amount of travel of the box spring members along the longitudinal axis of the lower support frames, and the distance between the intermediate channel element and one end channel element and adjacent side edges of the box spring members defining the amount of travel of the box spring members relative to the transverse axis of the lower support frames, said channel elements including a communicating downwardly opening inverted U-shaped cross section track overlying the guide means on the lower support frames, said guide means comprising bearing retainers supporting at their upper ends a ball bearing element received within the inverted U-shaped cross section track.

8. [A bed assembly comprising a pair of lower support frames disposed in spaced parallel relationship on a support surface and including rectangularly related side and end frame elements having depending leg members adjacent intersecting corners thereof, guide means extending vertically from spaced upper surface portions of the side frame elements adjacent said intersecting corners, rectangular box spring members of a greater width than the lower support frames juxtapositionable on the support frames with side edge portions adjacent each other for supporting mattresses thereon defining a simulated single oversized bed, guide track means on a lower support surface of the box spring members engageable with the guide means on the respective lower support frames permitting the box spring members to be moved independently and sequentially a predetermined distance along the longitudinal and transverse axes of the respective lower support frames affording an access passage between the lower support frames, one of the end frame elements of the lower support frames extending between opposite intermediate portions of the side frame elements thereof defining a pair of support arms at one end of the lower support frames, and an adjustable head board support assembly extending transversely between end portions of the support arms of the lower support frames, the adjustable head board support assemblies comprising a pair of elongated strap elements comprising overlapping end portions and including elongated longitudinal overlying slot portions therethrough, a fastener assembly extending through the slot portions permitting the composite length of the strap elements to be adjusted, said strap elements including second elongated longitudinal slot portions therethrough, and fastener means extendible through the second elongated slot portions in engagement with terminal end portions of the support arms affording transverse adjustment of the head board support assemblies relative to the lower support frames upon which they are mounted, said strap elements including means thereon for receiving fastener elements therethrough securable to a head board disposed vertically relative to the respective lower support frames, the adjustable head board support assemblies being adjustable toward and away from each other for positioning the head boards adjacent each other and simulating a single head board.]

*9. A bed assembly comprising a lower support frame including rectangularly related side and end frame elements, guide means extending vertically from spaced upper surface portions of the side frame elements adjacent the intersecting corners of the frame elements for reciprocably supporting a rectangular box spring member thereon, a rectangular box spring member of a greater width than the lower support frame juxtapositionable on the lower support frame, and means for engaging said guide means disposed on a lower surface portion of the box spring member, said last mentioned means engaging the lower surface portion of the box spring member permitting the box spring member to be moved predetermined distances sequentially along both the longitudinal and transverse axes of the lower support frame, said guide means-engaging means comprising track means for each of said guide means having some portions thereof arranged substantially parallel to and other portions substantially transversely to the longitudinal axis of said box spring member.*

*10. A bed assembly comprising a pair of lower support frames disposed in spaced parallel relationship on a support surface and including rectangularly related side and end frame elements, guide means extending vertically from spaced upper surface portions of the side frame elements adjacent the intersecting corners, rectangular box spring members of a greater width than the lower support frames juxtapositionable on the support frames with slide edge portions adjacent each other for supporting mattresses thereon defining a simulated single oversized bed, and means for engaging said guide means on said lower support frames disposed on a lower surface portion of each of said box spring members, said guide means-engaging means permitting the box spring members to be moved independently and sequentially a predetermined distance along both the longitudinal and transverse axes of the respective lower support frames affording an access passage between the lower support frames, said guide means-engaging means permitting movement along both the longitudinal and transverse axes of the lower support frame of each bed being substantially uniplanar, said guide means-engaging means comprising track means for each of said guide means having some portions thereof arranged substantially parallel to and other portions substantially transversely to the longitudinal axis of the box spring member to which secured.*

*11. A bed assembly comprising a lower support frame including rectangularly related side and end frame elements, guide means extending vertically from spaced upper surface portions of the side frame elements adjacent the intersecting corners of the frame elements for reciprocably supporting a rectangular box spring member thereon, a rectangular box spring member of a greater width than the lower support frame juxtapositionable on the lower support frame, and guide track means on a lower surface portion of the box spring member engageable with the guide means on the side frame elements permitting the box spring member to be moved predetermined distances sequentially along both the longitudinal and transverse axes of the lower support frame, said guide track means having first portions disposed parallel to said box spring member longitudinal axis for engaging said guide means and enabling said box spring member to be moved along a path parallel to said box spring member longitudinal axis, and second portions arranged at right angles thereto for engaging said guide means and enabling said box spring member to be moved transversely relative to said box spring longitudinal axis, the length of said track means second portions substantially defining the difference in width between said support frame and said overlying box spring member.*

*12. A bed assembly comprising a lower support frame including rectangularly related side and end frame elements, guide means extending vertically from spaced upper surface portions of the side frame elements adjacent the intersecting corners of the frame elements for reciprocably supporting a rectangular box spring member thereon, a rectangular box spring member of a greater width than the lower support frame juxtapositionable on the lower support frame, and guide track means on a lower surface portion of the box spring member engageable with the guide means on the side frame elements permitting the box spring member to be moved predetermined distances sequentially along both the longitudinal and transverse axes of the lower support frame affording an access path between two lower support frames disposed in spaced parallel longitudinal alignment on the support surface, said guide track means comprising first uniform track means arranged substantially parallel to the box spring member longitudinal axis and second uniform track means disposed at right angles thereto said first and second track means being substantially uniplanar.*

References Cited in the file of this patent or the original patent

UNITED STATES PATENTS

| | | |
|---|---|---|
| 1,870,763 | Znidersic | Aug. 9, 1932 |
| 1,916,346 | Toncray et al. | July 4, 1933 |
| 1,972,712 | Lager | Sept. 4, 1934 |
| 2,480,025 | Hunter | Aug. 23, 1949 |
| 2,553,652 | Gradle et al. | May 22, 1951 |
| 2,559,998 | Rega et al. | July 10, 1951 |
| 2,571,903 | Loewi et al. | Oct. 16, 1951 |
| 2,599,383 | Graham | June 3, 1952 |
| 2,670,479 | Gottlieb et al. | Mar. 2, 1954 |
| 2,740,133 | Fox | Apr. 3, 1956 |

FOREIGN PATENTS

| | | |
|---|---|---|
| 963,326 | France | July 5, 1950 |
| 1,015,017 | France | June 25, 1952 |